(12) United States Patent
Gao

(10) Patent No.: US 11,609,123 B2
(45) Date of Patent: Mar. 21, 2023

(54) CALIBRATION METHOD, DEVICE FOR INFRARED TEMPERATURE MEASUREMENT, ELECTRONIC APPARATUS AND STORAGE MEDIUM

(71) Applicant: Baidu Online Network Technology (Beijing) Co., Ltd, Beijing (CN)

(72) Inventor: Shupeng Gao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 271 days.

(21) Appl. No.: 16/868,872

(22) Filed: May 7, 2020

(65) Prior Publication Data
US 2021/0285823 A1    Sep. 16, 2021

(30) Foreign Application Priority Data

Mar. 10, 2020    (CN) .......................... 202010163128.5

(51) Int. Cl.
*G01J 5/53*    (2022.01)
*G01J 5/00*    (2022.01)

(52) U.S. Cl.
CPC .......... *G01J 5/53* (2022.01); *G01J 2005/0077* (2013.01)

(58) Field of Classification Search
None
See application file for complete search history.

(56) References Cited

U.S. PATENT DOCUMENTS

| 10,386,241 B1 | 8/2019 | Staple et al. |
| 2004/0254472 A1 | 12/2004 | McQuilkin |
| 2014/0314118 A1 | 10/2014 | LaVeigne et al. |

(Continued)

FOREIGN PATENT DOCUMENTS

| CN | 101183026 A | 5/2008 |
| CN | 102338665 A | 2/2012 |

(Continued)

OTHER PUBLICATIONS

The State Intellectual Property Office of People's Republic of China, First Office Action, issued in connection with CN Application No. 202010163128.5, dated Feb. 24, 2022 (23 pages).

(Continued)

*Primary Examiner* — Erica S Lin
(74) *Attorney, Agent, or Firm* — Banner & Witcoff, Ltd.

(57) ABSTRACT

A calibration method, device for infrared temperature measurement, an electronic apparatus and a storage medium are provided. The method includes: obtaining a monitoring temperature and an actual temperature of a black body, wherein the monitoring temperature of the black body is monitored by an infrared thermal imager, and the black body is an object having a thermal conductivity greater than a first threshold and being uniformly heated; calculating a difference between the monitoring temperature and the actual temperature; and calibrating the infrared thermal imager with the difference. In the embodiment of the present application, the cost of the black body is reduced and the stability of a measurement result is improved, thereby improving using effect of the calibration method for the infrared temperature measurement.

10 Claims, 3 Drawing Sheets

(56) References Cited

U.S. PATENT DOCUMENTS

| | | | | |
|---|---|---|---|---|
| 2015/0342465 | A1* | 12/2015 | Chang | G01J 5/04 600/474 |
| 2018/0106680 | A1* | 4/2018 | Nakamura | G01K 15/002 |
| 2019/0212201 | A1 | 7/2019 | Wei | |

FOREIGN PATENT DOCUMENTS

| | | |
|---|---|---|
| CN | 105562307 A | 5/2016 |
| CN | 107687899 B | 2/2018 |
| CN | 110108364 A | 8/2019 |
| CN | 110108364 A | 9/2019 |
| CN | 110686781 A | 1/2020 |
| EP | 3362769 A1 | 8/2018 |
| EP | 3362769 B1 | 2/2020 |
| JP | 02107049 U | 4/1989 |
| JP | 07270256 A | 10/1989 |
| JP | H051891 A | 1/1993 |
| JP | H07270256 A | 10/1995 |
| JP | 2012254222 A | 12/2012 |
| JP | 2012254222 A | 5/2016 |
| JP | 2017015596 A | 1/2017 |
| JP | 2017062125 A | 3/2017 |
| JP | 2018501469 A | 1/2018 |

OTHER PUBLICATIONS

The State Intellectual Property Office of People's Republic of China, Search Report, issued in connection with CN Application No. 202010163128.5, dated Feb. 24, 2022 (6 pages).

Office Action issued in Japanese Patent Application No. 2020-084587, dated Jun. 15, 2019, 8 pgs.

Extended European Search Report dated Oct. 8, 2020 in EP20174381.2, 14 pgs.

Office Action dated Aug. 21, 2020 in JP2020-084587, 11 pgs.

Extended Area Blackbody ControlMaster, on-line catalog 607-700H, Jan. 2013, 2 pgs.

Irani, K., Variable Temperature Blackbody Source as Primary Standards, Proceedings of the SPIE, vol. 6205, id. 620506, Apr. 2006 (20 pages).

Anonymous, SR-800R: Extended Area Blackbody Control/Master, CI-Systems.com, Lambdaphoto.co.uk, Jan. 2, 2013 (2 pages).

\* cited by examiner

CALIBRATION METHOD, DEVICE FOR INFRARED TEMPERATURE MEASUREMENT, ELECTRONIC APPARATUS AND STORAGE MEDIUM

CROSS-REFERENCE TO RELATED APPLICATION

This application claims priority to Chinese Patent Application No. 202010163128.5, entitled "Calibration Method, Device for infrared temperature measurement, Electronic apparatus and Storage medium", and filed on Mar. 10, 2020, which is hereby incorporated by reference in its entirety.

TECHNICAL FIELD

This application relates to the field of thermal imaging, and in particular to the field of infrared temperature measurement.

BACKGROUND

An infrared thermal imager measures a temperature of a measured target by collecting and quantifying the radiated infrared energy of the measured target within a waveband of the imager. The infrared thermal imager will be affected by various factors during long-term use, thereby causing errors. At present, a blackbody is generally used for calibration. The blackbody is an ideal radiator, which absorbs radiant energy of all wavelengths without reflection and transmission of energy, and a surface emissivity of which is 1. However, there is no real blackbody in nature. The blackbody used in calibrating the infrared thermal imager is an object with a surface emissivity close to 1.

The black body in actual use combines thermodynamics principles. A cavity is arranged inside the blackbody, and a structure of the cavity is complicated. The temperature of the black body needs to be manually set and be constant, and a constant temperature circuit needs a continuous feedback. These characteristics lead to a high cost of the black body, and actual stability is poor, which results in a poor effect in the current calibration method with infrared temperature measurement.

SUMMARY

A calibration method, device for infrared temperature measurement, an electronic apparatus and a storage medium are provided according to embodiments of the present disclosure.

According to a first aspect, a calibration method for infrared temperature measurement is provided according to an embodiment of the application, including:

obtaining a monitoring temperature and an actual temperature of a black body, wherein the monitoring temperature of the black body is monitored by an infrared thermal imager, and the black body is an object having a thermal conductivity greater than a first threshold and being uniformly heated;

calculating a difference between the monitoring temperature and the actual temperature;

calibrating the infrared thermal imager with the difference.

In an embodiment of the present application, an object with a thermal conductivity greater than the first threshold and being uniformly heated is used as a black body, so that the cost of the black body is reduced and a stability of a measurement result is improved, thereby improving an effect in using the calibration method for the infrared temperature measurement.

In an implementation, a surface of the black body is an object having an emissivity greater than a second threshold and a thermal conductivity coefficient greater than a third threshold.

In an embodiment of the application, the surface of the black body is a material with a high emissivity and a good thermal conductivity, which can prevent inaccurate measurement caused by the low thermal conductivity of the black body itself.

In an implementation, a material of the black body includes a metal, and the metal comprises aluminum or red copper.

In an embodiment of the present application, the metal with a good thermal conductivity is used as the material of the black body. In particular, the aluminum with a lower price is used as the material of the black body, thereby reducing the cost of the blackbody In an implementation, the surface of the black body includes a graphene coating or an adhesive tape.

In an implementation, the actual temperature of the black body is measured by a temperature sensor provided into the black body.

In an embodiment of the present application, a temperature sensor provided into the black body is used to measure the actual temperature of the black body, which can ensure accurate measurement.

In an implementation, the black body is heated by a constant voltage power supply and a heating wire.

According to a second aspect, a calibration device for infrared temperature measurement is provided according to an embodiment of the application, including:

an obtaining module configured to obtain a monitoring temperature and an actual temperature of a black body, wherein the monitoring temperature of the black body is monitored by an infrared thermal imager, and the black body is an object having a thermal conductivity greater than a first threshold and being uniformly heated;

a calculating module configured to calculate a difference between the monitoring temperature and the actual temperature;

a calibrating module configured to calibrate the infrared thermal imager with the difference.

In an implementation, a surface of the black body is an object having an emissivity greater than a second threshold and a thermal conductivity coefficient greater than a third threshold.

In an implementation, a material of the black body comprises a metal, and the metal includes aluminum or red copper.

In an implementation, the surface of the black body includes a graphene coating or an adhesive tape.

In an implementation, the actual temperature of the black body is measured by a temperature sensor provided into the black body.

In an implementation, the black body is heated by a constant voltage power supply and a heating wire.

According to a third aspect, a black body for infrared temperature measurement is provided according to an embodiment of the application, including:

an object having a thermal conductivity greater than a first threshold and being uniformly heated.

In an implementation, a surface of the black body is an object having an emissivity greater than a second threshold and a thermal conductivity coefficient greater than a third threshold.

In an implementation, a material of the black body comprises a metal, and the metal comprises aluminum or red copper.

In an implementation, the surface of the black body comprises a graphene coating or an adhesive tape.

According to a fourth aspect, an electronic apparatus is provided in an embodiment of the application, includes:
   at least one processor; and
   a memory communicated with the at least one processor; wherein,
   instructions executable by the at least one processor is stored in the memory, and the instructions executed by the at least one processor to enable the at least one processor to implement the methods provided by any one of the embodiments of the first aspect.

According to a fifth aspect, a non-transitory computer-readable storage medium storing computer instructions is provided in an embodiment of the application, wherein the computer instructions is configured to enable a computer to implement the methods provided by any one of the embodiments of the first aspect.

One embodiment in the above application has the following advantages or beneficial effect. With the embodiments of the present application, the cost of the black body is reduced and the stability of a measurement result is improved, thereby improving the effect in using the calibration method for the infrared temperature measurement.

Other effects of the foregoing optional manners will be described below in conjunction with specific embodiments.

BRIEF DESCRIPTION OF THE DRAWINGS

The drawings are used to better understand the solution, and do not constitute a limitation on the application. among them.

DETAILED DESCRIPTION

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for public knowledge of functions and structures are omitted in the following descriptions.

Figure 1:
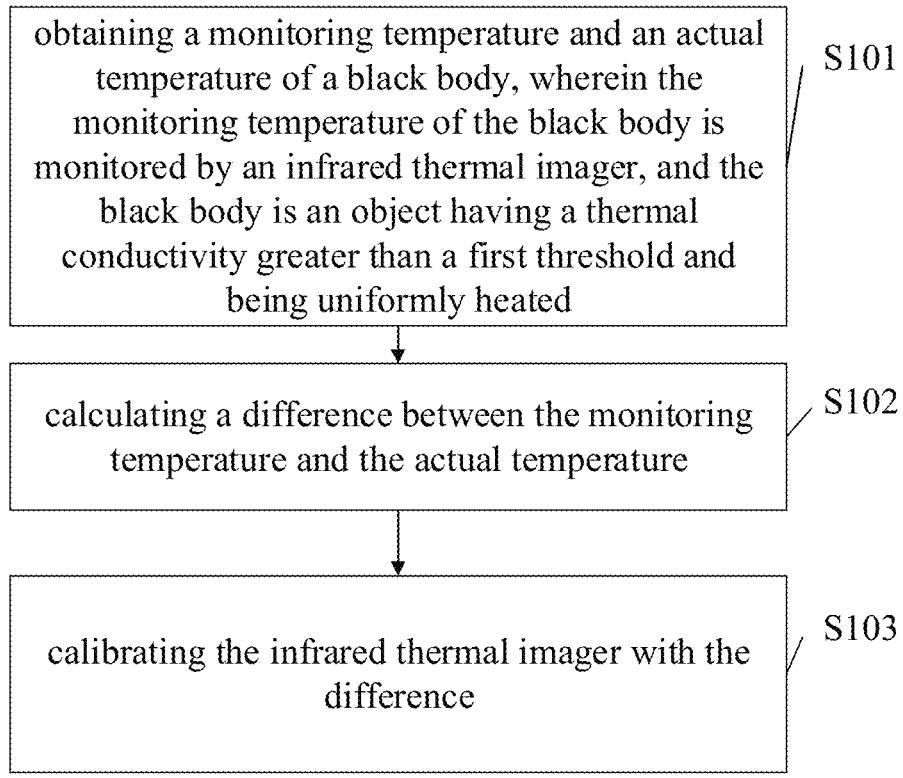
FIG. 1 is an implementation flowchart of a calibration method for infrared temperature measurement according to an embodiment of the present application.

A calibration method for infrared temperature measurement is provided according to an embodiment of the present application. As shown in FIG. 1, an implementation flowchart of a calibration method for infrared temperature measurement is shown, and the method includes:

S101, obtaining a monitoring temperature and an actual temperature of a black body; wherein the monitoring temperature of the black body is monitored by an infrared thermal imager, and the black body is an object having a thermal conductivity greater than a first threshold and being uniformly heated;

S102, calculating a difference between the monitoring temperature and the actual temperature; and S103, calibrating the infrared thermal imager based on the difference.

The above black body may be made of a material with a good thermal conductivity, such as a metal material, to ensure that it can be uniformly heated. In an embodiment of the present application, a black body material with the thermal conductivity greater than the first threshold is used, such as an aluminum block with a thickness of 15 mm. Thermal conductivity refers to transferred heat through an area of 1 $m^2$ of a 1-meter-thick material with a surface temperature difference of 1 degree (K, ° C.) on two sides thereof under stable heat transfer conditions over a certain period of time, the unit of which is W/(m·K), where K can be replaced by ° C.

In an embodiment of the present application, the first threshold may be set to 200 W/(m·K).

In an embodiment of the present application, a material with a high emissivity and a high thermal conductivity is used on the surface of the black body to prevent inaccurate measurement caused by the low emissivity of the metal block itself.

In a possible implementation, the surface of the black body is an object having an emissivity greater than a second threshold and a thermal conductivity greater than a third threshold.

In one example, the second threshold is 0.95, and the third threshold is 150 W/(m·K).

In one example, the material of the black body includes a metal, and the metal includes aluminum or red copper.

Herein, the thermal conductivity of aluminum is 230 W/(m·K), and the thermal conductivity of red copper is 386.4 W/(m·K).

In a possible implementation, the surface of the black body is a graphene coating or an adhesive tape. In one example, the above-mentioned adhesive tape may be a tape with a type of 3M #1500.

In a possible implementation, the actual temperature of the black body is measured by a temperature sensor provided into the black body. Particularly, a Platinum thermal resistance sensor can be used, and the actual temperature is transmitted back to a thermal imager system through a Microcontroller Unit (MCU). The thermal imager system can obtain both the monitoring temperature of the black body and the actual temperature of the black body. Real-time compensation can be performed through a difference between the two temperatures to ensure that data of the temperature monitored each time is used with reference to the black body.

In an embodiment of the present application, the above-mentioned black body may be heated by a constant voltage power source and a heating wire. After being heated to a certain degree, the temperature of the aluminum block can be kept constant with an unchanged external environment.

Figure 2:
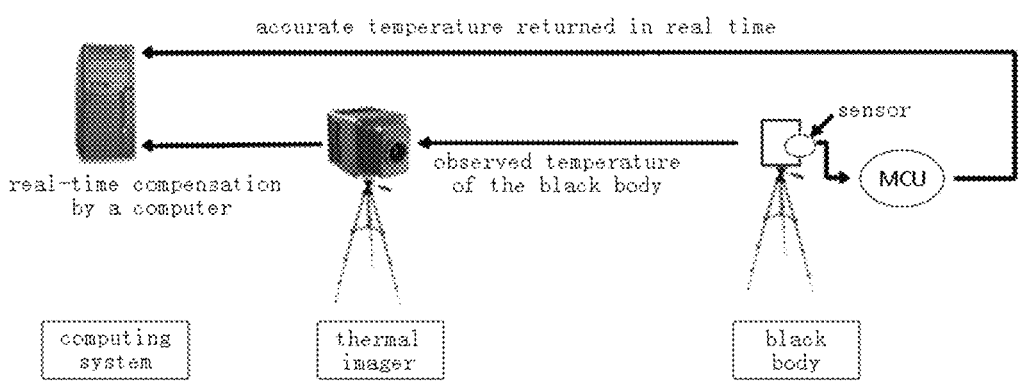
FIG. 2 is a schematic diagram of an overall system for implementing the calibration for infrared temperature measurement according to an embodiment of the present application.

FIG. 2 is a schematic diagram of an overall system for implementing infrared temperature measurement calibration according to an embodiment of the present application. As shown in FIG. 2, the system includes an infrared thermal imager, a blackbody, and a computing system. Here, a temperature sensor is provided inside the black body, the temperature sensor being configured to measure an actual temperature of the black body, and return the actual temperature of the black body to the computing system in real time by the MCU. The actual temperature measured by the temperature sensor is considered to be an exact temperature of the black body. The infrared thermal imager monitors a monitoring temperature of the black body and provides the monitoring temperature to the computing system. The computing system performs calibration of the infrared thermal imager based on the difference between the monitoring temperature and the actual temperature. Particularly, by calculating the difference, real-time compensation is performed on the monitoring temperature of an object/a human body to ensure that data of the monitoring temperature of the object/human body obtained each time is calibrated with reference to data of the black body.

By calculating the difference, a difference compensation is performed for each pixel point as obtained, to eliminate a temperature drift of the thermal imager. The temperature drift refers to that each pixel of temperature measurement is higher or lower than a certain temperature. When the temperature drift occurs, for example, the thermal imager will have a temperature increase of 0.1 degree per second. Here, all temperatures (i.e., for each pixel) are increased. An accurate value will not be restored until a next bezel calibration is performed. The bezel calibration is a timing calibration method commonly used by the thermal imager, which is performed approximately every 10 minutes.

Figure 3:
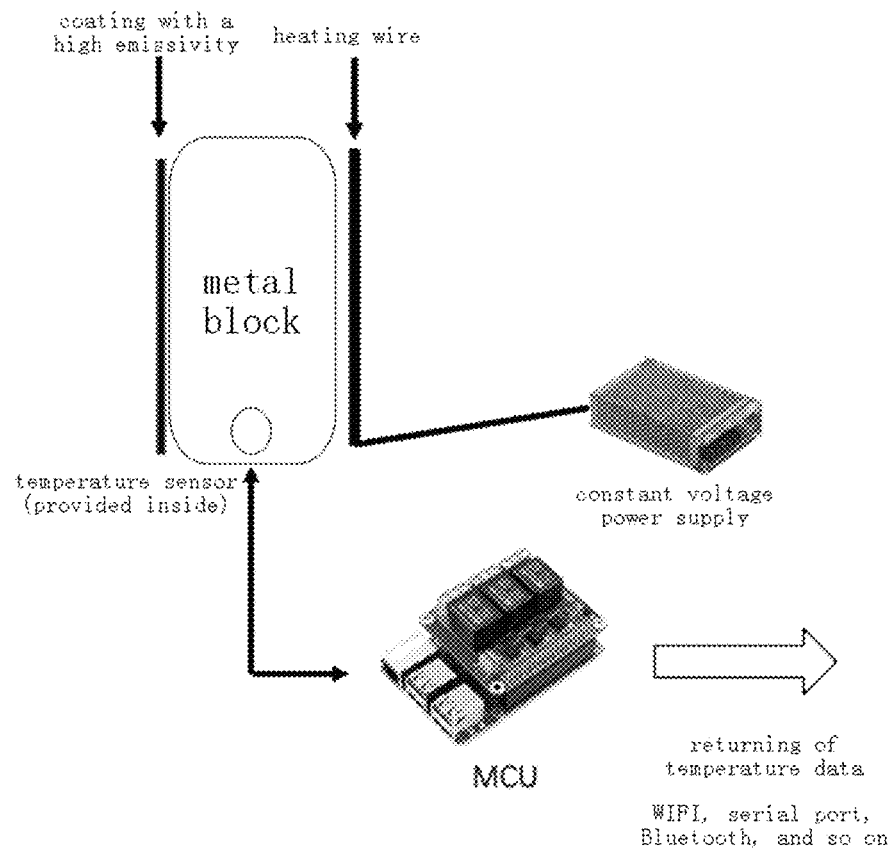
FIG. 3 is a schematic diagram of a black body part in an overall system for implementing the calibration for infrared temperature measurement according to an embodiment of the present application.

FIG. 3 is a schematic diagram of a black body part in the overall system for implementing infrared temperature calibration according to an embodiment of the present application. As shown in FIG. 3, in an embodiment of the present application, the material of the black body is made of metal blocks, and a coating with a high emissivity is applied to an exterior of the black body. Further, a heating wire, which can be heated by a constant voltage power supply, is provided outside the black body, to heat the black body. A temperature sensor is provided inside the black body. The temperature sensor measures the actual temperature of the black body, which is transmitted back to the computing system by the MCU. The MCU can transmit the actual temperature of the black body through WIFI, a serial port, Bluetooth, and the like.

Figure 4:
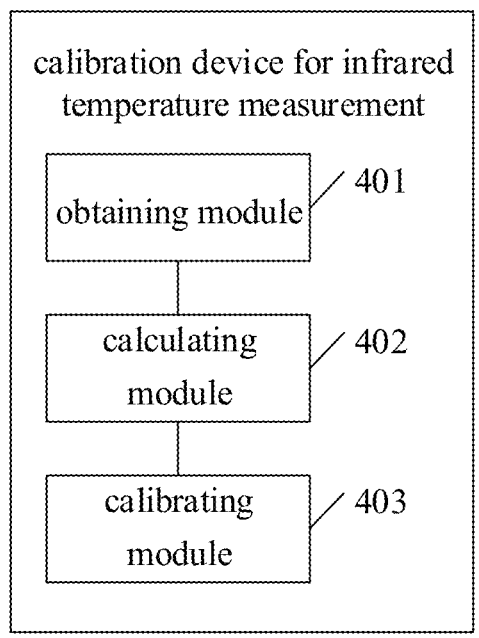
FIG. 4 is a schematic structural diagram of a calibration device for infrared temperature measurement according to an embodiment of the present application.

A calibration device for infrared temperature measurement is further provided according to an embodiment of the present application. FIG. 4 is a schematic structural diagram of a calibration device for infrared temperature measurement according to an embodiment of the present application, the device including:

an obtaining module 401 configured to obtain a monitoring temperature and an actual temperature of a black body, wherein the monitoring temperature of the black body is monitored by an infrared thermal imager, and the black body is an object having a thermal conductivity greater than a first threshold and being uniformly heated;

a calculating module 402 configured to calculate a difference between the monitoring temperature and the actual temperature; and a calibrating module 403 configured to calibrate the infrared thermal imager with the difference.

Alternatively, a surface of the black body is an object having an emissivity greater than a second threshold and a thermal conductivity coefficient greater than a third threshold.

Alternatively, a material of the black body comprises a metal, and the metal comprises aluminum or red copper.

In a possible implementation, the surface of the black body comprises a graphene coating or an adhesive tape.

Alternatively, the actual temperature of the black body is measured by a temperature sensor provided into the black body.

In a possible implementation, the black body is heated by a constant voltage power supply and a heating wire.

A black body for infrared temperature measurement is provided in an embodiment according to the application. The black body includes an object having a thermal conductivity greater than a first threshold and being uniformly heated.

In a possible implementation, a surface of the black body is an object having an emissivity greater than a second threshold and a thermal conductivity coefficient greater than a third threshold.

Alternatively, a material of the black body comprises a metal, and the metal comprises aluminum or red copper.

In a possible implementation, the surface of the black body comprises a graphene coating or an adhesive tape.

The technical indicators of the black body proposed in the embodiments of the present application are as follows in Table 1.

TABLE 1

| Temperature range | 20° C.~50° C. |
| Heating plate area | Square with 80 mm |
| Temperature accuracy | ±0.1° C./Hour |
| Temperature resolution | 0.05° C. |
| Temperature accuracy | +0.20% (Full scale) |
| Effective emissivity | 0.97 |

In summary, the calibration method, device and black body for the infrared temperature measurement are proposed in the embodiments of the present application by using calibration technology for infrared temperature measurement based on the black body of the constant temperature aluminum block, and the material is selected to be metal aluminum with a lower cost and a good heat stability. The temperature of aluminum observed by the infrared thermal imager is compared with the actual temperature of aluminum detected by the sensor to calculate observed temperature difference, so that the object/human temperature difference detected by the infrared camera can be calibrated due to changes in the ambient temperature in practical applications. In the embodiments of the present application, red copper can also be used as the material of the black body. With the embodiments of the present application, the problems of a high black body cost and an insufficient accuracy in the current market can be solved, and the embodiments be applied to scenes that require extremely high temperature detection, such as a scene of a human body temperature detection. The embodiments of the present application relates to fields, such as the detection of body temperature in public places for preventing and controlling epidemic.

In this embodiment, functions of modules in each device refer to the corresponding description of the above mentioned method and thus the description thereof is omitted herein.

According to an embodiment of the present application, an electronic apparatus and a non-transitory computer readable storage medium are further provided according to the present application.

Figure 5:
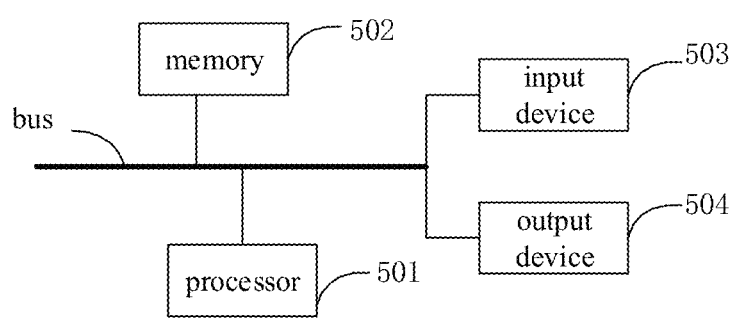
FIG. 5 is a block diagram of an electronic device used to implement the calibration method for infrared temperature measurement of the embodiment of the present application.

As shown in FIG. 5, it is a block diagram of an electronic apparatus according to the content placement method according to the embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital processing, cellular phones, intelligent phones, wearable devices, and other similar computing devices. The components shown here, their connections and relationships, and their functions are merely examples, and are not intended to limit the implementation of the application described and/or required herein.

As shown in FIG. 5, an electronic apparatus includes: one or more processors 501, a memory 502, and interfaces for connecting various components, including a high-speed interface and a low-speed interface. The various components are interconnected using different buses and can be mounted on a common motherboard or otherwise installed as required. The processor may process instructions executed within the electronic apparatus, including storing in or on a memory to display a graphical user interface (GUI) on an external input/output device such as a display device coupled to the interface) Graphic information instructions. In other embodiments, multiple processors and/or multiple buses can be used with multiple memories and multiple memories, if desired. Similarly, multiple electronic apparatus can be connected, each providing some of the necessary operations (for example, as a server array, a group of blade servers, or a multiprocessor system). A processor 501 is taken as an example in FIG. 5.

The memory 502 is a non-transitory computer-readable storage medium provided by the present application. The memory stores instructions executable by at least one processor, so that the at least one processor executes the infrared thermal imager calibration method provided in the present application. The non-transitory computer-readable storage medium of the present application stores computer instructions, which are used to cause a computer to execute the calibration method provided by the present application.

As a non-transitory computer-readable storage medium, the memory 502 can be used to store non-transitory software programs, non-transitory computer executable programs, and modules, such as program instructions/module corresponding to the content placement method in the embodiments of the present application. The processor 501 executes various functional applications and data processing of the server by running non-transitory software programs, instructions, and modules stored in the memory 502, that is, the content placement method in the embodiments of the foregoing method can be implemented.

The memory 502 may include a storage program area and a storage data area, where the storage program area may store an operating system and an application program required for at least one function; the storage data area may store data created according to the use of the electronic device of the content placement method, etc. In addition, the memory 502 may include a high-speed random access memory, and may also include a non-transitory memory, such as at least one magnetic disk storage device, a flash memory device, or other non-transitory solid-state storage device. In some embodiments, the memory 502 may optionally include a memory remotely set relative to the processor 501, and these remote memories may be connected to the electronic apparatus with the content placement method through a network. Examples of the above network include, but are not limited to, the Internet, an intranet, a local area network, a mobile communication network, and combinations thereof.

The electronic apparatus with the content placement method may further include an input device 503 and an output device 504. The processor 501, the memory 502, the input device 503, and the output device 504 may be connected through a bus or in other manners. In FIG. 5, the connection through the bus is taken as an example.

The input device 503 can receive inputted numeric or character information, and generate key signal inputs related to user settings and function control of an electronic apparatus for content placement method, such as a touch screen, a keypad, a mouse, a trackpad, a touchpad, a pointing stick, one or more mouse buttons, a trackball, a joystick and other input devices. The output device 504 may include a display device, an auxiliary lighting device (for example, an LED), a haptic feedback device (for example, a vibration motor), and the like. The display device may include, but is not limited to, a liquid crystal display (Liquid Crystal Display, LCD), a light emitting diode (Light Emitting Diode, LED) display, and a plasma display. In some embodiments, the display device may be a touch screen.

Various implementations of the systems and technologies described herein can be implemented in digital electronic circuit systems, integrated circuit systems, application specific integrated circuits (ASICs), a computer hardware, a firmware, a software, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or code) include machine instructions of a programmable processor and can be implemented using high-level procedural and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLD)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a CRT (Cathode Ray Tube) or LCD (liquid crystal display) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a subscriber computer of a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including such background components, middleware components, or any combination of front-end components. The components of the system may be interconnected by any form or medium of digital data communication (such as, a communication network). Examples of communication networks include: a local area network (LAN), a wide area network (WAN), and the Internet.

Computer systems can include clients and servers. The client and server are generally remote from each other and typically interact through a communication network. The client-server relationship is generated by computer programs running on the respective computers and having a client-server relationship with each other.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A calibration method for infrared temperature measurement, comprising:

obtaining a monitoring temperature and an actual temperature of a black body, wherein the monitoring temperature of the black body is monitored by an infrared thermal imager, and the black body has a thermal conductivity greater than a first threshold and is uniformly heated, wherein a material of the black body comprises a metal;

calculating a difference between the monitoring temperature and the actual temperature; and calibrating the infrared thermal imager with the difference; wherein the difference is used for real-time compensation for the monitoring temperature of an object/a human body to ensure data of the monitoring temperature of the object/the human body obtained each time is calibrated with reference to data of the black body.

2. The calibration method according to claim 1, wherein a surface of the black body is an object having an emissivity greater than a second threshold and a thermal conductivity coefficient greater than a third threshold.

3. The calibration method according to claim 1, wherein the metal comprises aluminum or red copper.

4. The calibration method according to claim 2, wherein the metal comprises aluminum or red copper.

5. The calibration method according to claim 1, wherein a surface of the black body comprises a graphene coating or an adhesive tape.

6. The calibration method according to claim 2, wherein a surface of the black body comprises a graphene coating or an adhesive tape.

7. The calibration method according to claim 1, wherein the actual temperature of the black body is measured by a temperature sensor provided into the black body.

8. The calibration method according to claim 2, wherein the actual temperature of the black body is measured by a temperature sensor provided into the black body.

9. The calibration method according to claim 1, wherein the black body is heated by a constant voltage power supply and a heating wire.

10. A non-transitory computer-readable storage medium, in which instructions of a computer are stored, wherein the instructions are configured to enable the computer to implement the method according to claim 1.

* * * * *